(12) United States Patent
Nagashima et al.

(10) Patent No.: US 9,457,501 B2
(45) Date of Patent: Oct. 4, 2016

(54) RESIN MOLDING, METHOD FOR MANUFACTURING THE SAME, AND METAL MOLD FOR MANUFACTURING THE SAME

(71) Applicant: SUZUKI MOTOR CORPORATION, Shizuoka (JP)

(72) Inventors: Hiroaki Nagashima, Shizuoka (JP); Hisashige Uebayashi, Shizuoka (JP)

(73) Assignee: SUZUKI MOTOR CORPORATION, Shizuoka (JP)

( * ) Notice: Subject to any disclaimer, the term of this patent is extended or adjusted under 35 U.S.C. 154(b) by 561 days.

(21) Appl. No.: 14/046,287

(22) Filed: Oct. 4, 2013

(65) Prior Publication Data

US 2014/0027946 A1 Jan. 30, 2014

Related U.S. Application Data

(62) Division of application No. 12/398,482, filed on Mar. 5, 2009, now abandoned.

(30) Foreign Application Priority Data

Mar. 19, 2008 (JP) ................................. 2008-070801

(51) Int. Cl.
*B29C 45/00* (2006.01)
*B29C 45/27* (2006.01)
*B29L 31/30* (2006.01)

(52) U.S. Cl.
CPC ........... *B29C 45/00* (2013.01); *B29C 45/0013* (2013.01); *B29C 45/0025* (2013.01); *B29C 45/0046* (2013.01); *B29C 45/2708* (2013.01); *B29L 2031/30* (2013.01); *Y10T 428/24479* (2015.01)

(58) Field of Classification Search
USPC .................................. 264/328.9, 328.1, 219
See application file for complete search history.

(56) References Cited

U.S. PATENT DOCUMENTS

| | | | |
|---|---|---|---|
| 5,804,315 A | 9/1998 | Takimoto et al. ............ 428/402 |
| 5,834,073 A * | 11/1998 | Greenblat ............ A47G 33/004 |
| | | | 264/259 |
| 6,143,815 A | 11/2000 | Mizutani et al. ............. 524/441 |
| 6,811,735 B2 | 11/2004 | Ueno et al. ................... 264/293 |
| 2002/0079676 A1* | 6/2002 | Ueno .................. B29C 45/0046 |
| | | | 280/728.2 |
| 2003/0004248 A1 | 1/2003 | Wakamura et al. .......... 524/441 |

(Continued)

FOREIGN PATENT DOCUMENTS

| | | |
|---|---|---|
| JP | 4-27932 | 1/1992 |
| JP | 8-239505 | 9/1996 |

(Continued)

OTHER PUBLICATIONS

Japanese Office Action dated Oct. 19, 2012, issued in corresponding Japanese Application No. 2008-070801.
German Office Action dated Nov. 26, 2012, issued in corresponding German Application No. 102009013789.0.
U.S. Appl. No. 12/398,482, filed Mar. 5, 2009, Hiroaki Nagashima, Suzuki Motor Corporation.

*Primary Examiner* — Alison L Hindenlang
*Assistant Examiner* — Kimberly A Stewart
(74) *Attorney, Agent, or Firm* — Stein IP, LLC

(57) ABSTRACT

A resin molding is provided. A main body is comprised of 100 parts by weight of thermoplastic resin and 0.1 to 4 parts by weight of bright material having the aspect ratio of 30 to 50. A main body has a design surface formed with a groove. The lower limit of the depth of the groove is set to 0.3 mm and the upper limit of the depth of the groove is set to 0.5 mm.

5 Claims, 7 Drawing Sheets

(56) References Cited

U.S. PATENT DOCUMENTS

2003/0021917 A1* 1/2003 Hotaka .................. B32B 27/08
                                                              428/29
2009/0289275 A1* 11/2009 Hayashi ............. B29C 45/0025
                                                              257/99

FOREIGN PATENT DOCUMENTS

| JP | 8-333602 | 12/1996 |
|----|----------|---------|
| JP | 11-192637 | 7/1999 |
| JP | 2001-113571 | 4/2001 |

* cited by examiner

RESIN MOLDING, METHOD FOR MANUFACTURING THE SAME, AND METAL MOLD FOR MANUFACTURING THE SAME

CROSS-REFERENCE TO RELATED APPLICATIONS

This application is a divisional of U.S. application Ser. No. 12/398,482, filed Mar. 5, 2009 in the U.S. Patent and Trademark Office, which claims the benefit of Japanese Patent Application No. 2008-070801, filed Mar. 19, 2008, in the Japanese Patent Office. All disclosures of the document(s) named above are incorporated herein by reference.

BACKGROUND OF THE INVENTION

1. Field of the Invention

The present invention relates to a resin molding, a method for manufacturing the resin molding and a metal mold for manufacturing the resin molding by injection molding method, and more particularly, to a metallic tone resin molding that prevents generation of appearance defects and has a color with metallic feeling caused by bright material to have excellent design properties, and a method and a metal mold for manufacturing the metallic tone resin molding.

2. Description of the Related Art

A four-wheel vehicle provided with a manual transmission (MT) includes a shift lever that is used to select the combination of gears of the MT by a driver. The shift lever is mounted on a floor in a vehicle cabin, an instrument panel (dashboard), a column for supporting a steering wheel, or the like. The shift lever includes a shift knob that is grasped by a driver. The shift knob includes a garnish, such as a shift garnish or a shift knob garnish. The shift garnish has letters or straight lines comprised of a plurality of grooves, that indicate the gear position of the MT. The shift garnish may have a color with metallic tone bright feeling.

An MT shift garnish of the four-wheel vehicle is one of significant factors for determining the impression of a driver's seat, and is an appreciative object under both sunlight and indoor light. Accordingly, a painted-component having a silver metallic color with the bright feeling, has been widely used as the MT shift garnish to obtain high design properties. However, volatile organic compound (VOC) generated due to the painting causes an environmental load, and thus the discharge of the VOC has been regulated in recent years (for example, Air Pollution Control Act of Japan (amended in 2004)). For this reason, there is a demand for a shift garnish that is formed without painting.

An injection molding method using resin material which colored with a colorant such as pigment or dye is known as such a paintless method. To color the resin material with a silver metallic color having high bright feeling, bright material such as aluminum powder or mica powder is added to the resin material. Particularly, to obtain high metallic feeling or pearl feeling, it is necessary to add the bright material.

However, appearance defects such as a "weld line" or a "flow mark" are likely to occur when using such resin material to which the bright material is added. In molding, a collision or a turbulent flow of the resin material occurs in the metal mold and thus flowability of the resin material deteriorates. Accordingly, the bright material is likely to be orientated in the metal mold. This orientation results in the weld line or the flow mark. In particular, the appearance defects such as the weld line or the flow mark are likely to occur when rectangular grooves are formed on a design surface of an MT shift garnish. As shown in FIG. 10A, the design surface of the MT shift garnish is formed with the rectangular grooves which indicate operative positions and directions of a shift lever. Therefore, unlike the painting, it is very hard to maintain high design properties in the resin molding. That is, it is very hard to secure the silver metallic tone which has high quality feeling while preventing the generation of the appearance defects. Further, the appearance defects such as the weld line or the flow mark are also likely to occur when the resin material contains bright material having high aspect ratio since the flowability of the resin material is decreased due to the bright material.

Patent Document 1 discloses a method for mixing 0.1 to 20.0 parts by weight of a bright material which has a maximum outer diameter in the range of 10 [μm] to 1 [mm] to 100 parts by weight of a thermoplastic resin so that a mean particle spacing D of the bright material and a weld width H satisfy an expression D≥H. This method disclosed in Patent Document 1 can suppress the weld line, but cannot completely eliminate the weld line. Further, this method cannot be applied to bright material that has a maximum outer diameter smaller than 10 [μm].

Patent Document 2 discloses a method for eliminating the weld line by adding a titanium oxide, a lead oxide, or a zinc oxide, which is called a weld-eliminating agent, to a resin. However, this method disclosed in Patent Document 2 increases cost and causes difficulty in color matching. Although Patent Document 2 mentions a high quality color tone such as a metallic tone or a pearl tone, can be obtained by the disclosed method, the metallic feeling significantly deteriorates when the weld-eliminating agent is added in actuality.

Patent Document 3 discloses a method for adding 0.05 to 10 parts by weight of metal powder that has the aspect ratio in the range of 3 to 15 and the mean particle diameter in the range of 10 to 300 [μm], and adding predetermined parts by weight of a thermoplastic resin (for example, polyethylene or polypropylene) that has a reactive group other than a polyamide resin, which suppresses a weld line, in order to obtain a metallic tone polyamide resin molding which has no weld line and excellent appearance without painting the resin molding. However, Patent Document 3 is completely silent about a molding formed with rectangular grooves on a design surface thereof. Further, Patent Document 3 does not discuss the degree of the metallic feeling.

CITATION LIST

Patent Literatures

Patent Document 1: Japanese Patent Publication No. 04-027932A

Patent Document 2: Japanese Patent Publication No. 08-239505A

Patent Document 3: Japanese Patent Publication No. 2000-086889A

Therefore, in the above related-art, it is difficult to obtain high design properties in a molding such as a garnish of an automotive part which has a complex shape in a design surface thereof by securing the metallic tone like the painted-component while preventing the generation of the appearance defects.

That is, in the related-art, the painting must be performed on the resin molding in order to obtain the high design properties. Without performing the painting, the bright feeling cannot be added to the resin material to prevent the generation of the appearance defects. Accordingly, a color of the molding is limited to a black or the like. In this case, the design properties of the molding are deteriorated.

SUMMARY OF THE INVENTION

It is therefore an object of the invention is to provide a metallic tone resin molding that secures high design properties obtained by a metallic feeling and prevents generation of appearance defects, even though a plurality of rectangular grooves are formed on a design surface of the resin molding, and a method and a metal mold for manufacturing the metallic tone resin molding.

According to an aspect of an exemplary embodiment of the present invention, there is provided a resin molding, comprising: a main body which is comprised of 100 parts by weight of thermoplastic resin and 0.1 to 4 parts by weight of bright material having the aspect ratio of 30 to 50, wherein a main body has a design surface formed with a groove; and wherein the lower limit of the depth of the groove is set to 0.3 mm and the upper limit of the depth of the groove is set to 0.5 mm.

With this configuration, since the aspect ratio Y of the bright material is relatively high, that is, in the range of 30 to 50, it is possible to obtain high metallic feeling due to the bright material. Further, since the depth of the groove is limited absolutely, it is possible to prevent the generation of appearance defects, such as a weld line or a flow mark. For this reason, it is not necessary to perform painting on a component which requires high design properties, such as various garnishes of automotive parts.

According to another aspect, there is also provided a method for manufacturing a resin molding, comprising: laminating a plurality of plates to form a cavity and a gate through which resin material is injected into the cavity; injecting the resin material which is comprised of 100 parts by weight of thermoplastic resin and 0.1 to 4 parts by weight of bright material, into the cavity through the gate; hardening the resin material to form the resin molding; and separating the plates to extract the resin molding from the cavity, wherein the plates are formed such that the resin molding includes a main body having a round-shaped design surface formed with a plurality of rectangular-shaped grooves, the longest groove of which extends in a first direction; and wherein the plates are formed such that the gate extends toward a center of the round-shaped design surface and at an angle range of 45°±30° with respect to the first direction.

With the above method, the resin flows through the gate which is extended at the angle range of 45°±30° with respect to the first direction (an extending direction of the longest groove of the rectangular-shaped grooves). Supplying the resin material which contains the bright material at this gate angle (range), it is possible to reduce the degree of the appearance defects such as a weld line or a flow mark as compared with the other gate angle (range).

According to still another aspect, there is provided a metal mold for manufacturing a resin molding, comprising: a first plate formed with a sprue; and a second plate; wherein the first plate and the second plate are formed such that a cavity, a gate and a runner are formed when the first plate is laminated on the second plate so that resin material is injected from the sprue into the cavity through the runner and the gate to form the resin molding; wherein the first plate and the second plate are formed such that the resin molding includes a main body having a round-shaped design surface formed with a plurality of rectangular-shaped grooves, the longest groove of which extends in a first direction; and wherein the first plate and the second plate are formed such that the gate extends toward a center of the round-shaped design surface and at an angle range of 45°±3° with respect to the first direction.

With the above configuration, the gate is provided so as to extend at the angle range of 45°±3° with respect to the first direction (an extending direction of the longest groove of the rectangular-shaped grooves). Supplying the resin material which contains the bright material at this gate angle (range), it is possible to reduce the degree of the appearance defects such as a weld line or a flow mark as compared with the other gate angle (range).

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
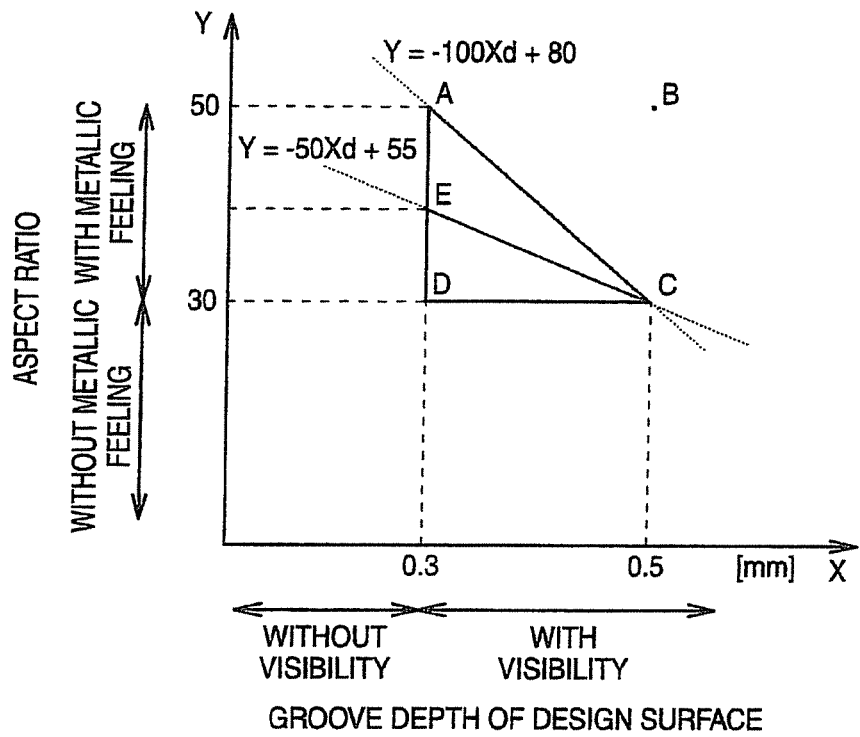
FIG. 1 is a explanatory diagram illustrating relationship between a range of the depth of groove formed on a design surface and a range of the aspect ratio of a bright material according to Embodiments 1 to 3 of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Hereinafter, three preferred embodiments of the present invention will be described below with reference to the drawings. Embodiment 1 corresponds to a metallic tone resin molding 11, Embodiment 2 corresponds to a method for manufacturing the metallic tone resin molding 11 shown in FIG. 15, and Embodiment 3 corresponds to a metal mold that is used for manufacturing the metallic tone resin molding 11 and is shown in FIG. 16.

Figure 6:
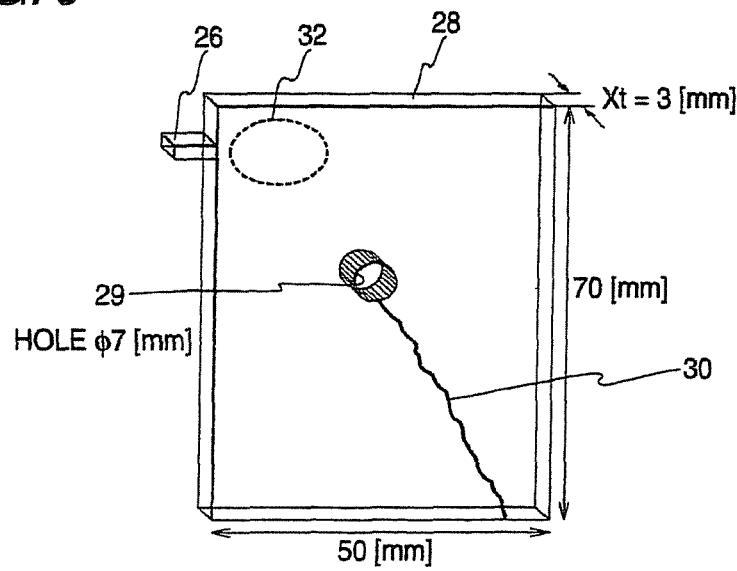
FIG. 6 is a view illustrating an example of a test piece according to Embodiment 1 to 3.
Figure 10A:
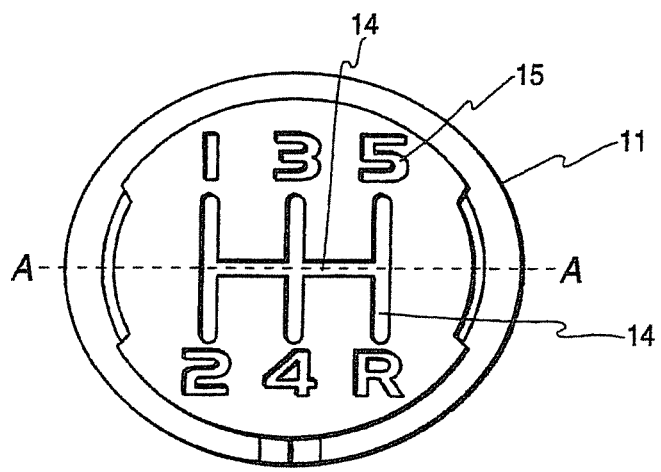
FIG. 10A is a plan view illustrating an example of a design surface of an MT shift garnish according to Embodiment 1 to 3.

In the embodiments, in order to obtain very high metallic feeling, experiments were performed under a condition where a weld line 30 and a flow mark 32 are likely to be generated on a bright material 10 having high aspect ratio Y that has not been used in the past (FIG. 6 and Tables 1 and 2). In addition, a molding material of a resin molding 11, which included a rectangular groove 14 on a design surface 12 thereof, was devised, and the generation states of the weld line 30 and the flow mark 32 were evaluated (FIG. 10A and Tables 3 and 4). As a result, if the following factors satisfy respective ranges, it is possible to obtain high design properties.

<Metallic Tone Resin: Condition 1>

In this embodiment, an aspect ratio Y of the bright material 10 is set in the range of 30 to 50 in order to obtain high metallic feeling. It is preferable that an aspect ratio Y be set in the range of 40 to 50 in order to obtain very high metallic feeling.

If an aspect ratio Y is high, appearance defects caused by the flowability of a resin, such as the weld line 30 and the flow mark 32, are likely to be generated. In this embodiment, the depth Xd of the rectangular groove on the design surface 12 of the molding is set in the range of 0.3 to 0.5 [mm] that corresponds to the lower limit of the visibility of the design formed by the groove 14. It is preferable that the length of the rectangular groove 14 in a direction of a long side 18 be set in the range of 0.3 to 0.4 [mm].

0.1 to 4.0 parts by weight of the bright material 10 are added to 100 parts by weight of a thermoplastic resin. This range does not affect strength (impact strength) of the resin molding (Table 1 to be described below). It is preferable that 2.0 to 4.0 parts by weight of the bright material 10 is added to 100 parts by weight of the resin when an opaque thermoplastic resin (for example, AES resin) is used as a base resin to obtain efficient metallic feeling. On the other hand, the metallic feeling can be secured when 0.1 to 0.5 parts by weight of the bright material 10 is added to transparent resin (PMMA resin or PC resin). Further, to obtain very high metallic feeling, it is preferable that 1.5 to 4.0 parts by weight of the bright material 10 is added. 2.0 parts by weight of the bright material is added in Tables 3 and 4 to be described below.

An aspect ratio Y further contributes to metallic feeling as compared to a mean particle diameter, but a mean particle diameter was set in the range of 5 to 40 [μm] in this embodiment. If an aspect ratio Y is high even though a mean particle diameter is set to 5 [μm], it is possible to obtain very high metallic feeling. Meanwhile, if an aspect ratio Y is set to 10 even though a mean particle diameter is 40 [μm], metallic feeling does not appear and plastic feeling is significantly strong.

As described above, in the metallic tone resin molding 11 according to this embodiment, 0.1 to 4 parts by weight of the bright material 10 having an aspect ratio Y of 30 to 50 based on 100 parts by weight of a thermoplastic resin were added, and the lower limit of the depth Xd of the rectangular groove on the design surface 12 was set to 0.3 [mm] (Condition 1).

Referring to FIG. 1, in Condition 1, a relationship between an aspect ratio Y represented on a vertical axis and a groove depth Xd represented on a horizontal axis corresponds to a range of points ABCD of FIG. 1.

A metallic tone is a property of a material that causes metallic feeling, and is a property that stimulates a human visual sense by the reflection of natural light or artificial light, which is radiated onto the design surface 12, on a surface and a body. A metallic tone cannot be particularly defined by light source colors (for example, RGB), and cannot be specified by reflected colors (Munsell or CMYK). A metallic tone depends on at least the degree of reflection on a predetermined area and the randomness thereof. For this reason, the presence and degree of a metallic tone are not physically measured and are measured by a human visual sense.

In the case of painting, it is possible to significantly increase metallic feeling with respect to the change of the state of a shadow depending on the brightness of reflected light and a light source position and reflected colors specified by a Munsell color system or a CMYK color system. Meanwhile, in the case of a resin molding, it is possible to obtain a predetermined reflected color by adding a color material, but it is difficult to further improve the metallic feeling as described above.

Figure 2:
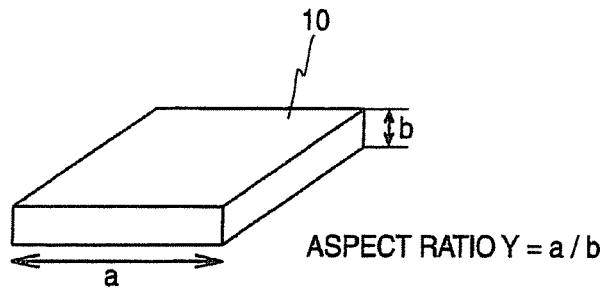
FIG. 2 is a explanatory diagram illustrating an example of definition of the aspect ratio according to Embodiments 1 to 3.

Metal powder such as aluminum powder, a material such as a mineral or mica powder (mica) that may be used in painting, or metallized pulverized glass may be used as the bright material 10. Aluminum powder is used in embodiments. In the invention, the bright material 10 does not have the shape of a sphere and a regular polyhedron and has an aspect ratio Y (=a/b) shown in FIG. 2.

A general-purpose resin or general-purpose engineering plastic may be used as the thermoplastic resin. Examples of the general-purpose resin include a PMMA resin (methacrylate resin), an ABS resin (contains acrylonitrile, butadiene, and styrene as chief ingredients), and an AES resin (in which ethylene rubber is used instead of butadiene) among ABS resins. Examples of the general-purpose engineering plastic include a PC resin (polycarbonate resin) and a PA resin (polyamide resin). The thermoplastic resin includes these resins and materials that are added for the purpose of target properties or coloring. Meanwhile, a weld-eliminating agent is not used in this embodiment.

Figure 3:
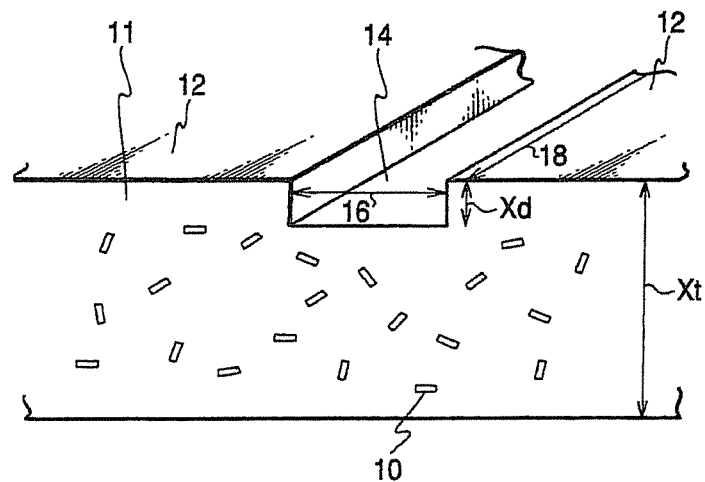
FIG. 3 is a perspective cross-sectional view illustrating an example of a groove of a resin molding according to Embodiments 1 to 3.

FIG. 3 is a cross-sectional and perspective view of a part of the resin molding 11. The resin molding 11 includes the rectangular groove 14, which is formed by short sides 16 and long sides 18, on the design surface 12.

The design surface 12 forms the appearance of the resin molding, and is a flat or curved surface. The shape of the design surface 12 corresponds to the shape of a cavity 52 of a metal mold that is used for injection molding. A rectangular shape on the design surface 12 is a rectangular shape on a flat or curved surface that is the design surface 12.

The rectangular groove 14 is a concave portion on the design surface 12 of the resin molding, and the shape on a flat or curved surface to which the concave portion and the design surface 12 are adjacent includes a rectangular shape. Even though each of end portions of the rectangular shape has a curvature, the overall shape is a rectangular shape. Accordingly, the rectangular groove 14 is formed.

Figure 4:
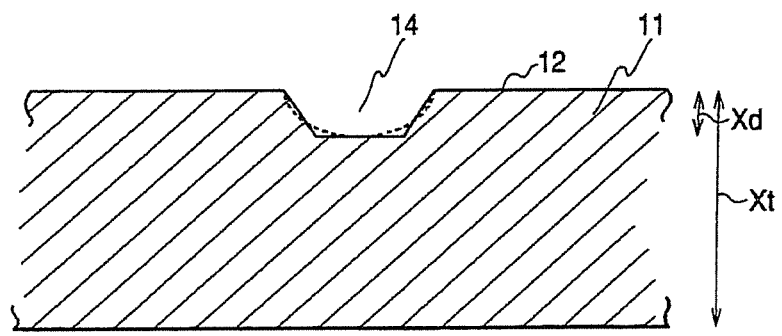
FIG. 4 is a cross-sectional view illustrating another example of the groove according to Embodiments 1 to 3.

The groove depth Xd is a distance from the design surface 12 to the bottom of the concave portion in a direction that is oriented toward the inside of the resin molding along a normal line of the design surface 12. The groove depth Xd is set in the range of 0.3 to 0.5 [mm]. The cross-sectional shape of the groove 14 may be a rectangular shape shown in FIG. 3 or a part of a trapezoidal or oval shape shown in FIG. 4.

Operational Advantage of Condition 1

Figure 5:
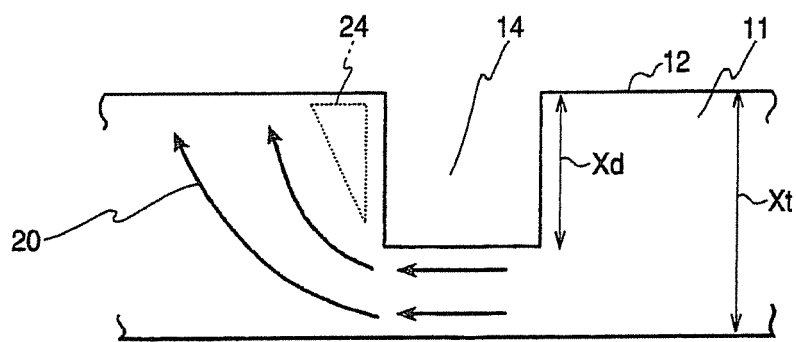
FIG. 5 is a view illustrating a relationship between the depth of the groove and appearance defects according to Embodiments 1 to 3.

Referring to FIG. 5, if the groove depth Xd of the groove 14 is large, the bright material 10 is likely to be oriented in a region, which is denoted by reference numeral 24 of FIG. 5, in consideration of a relationship between the flow 20 of a resin including the bright material 10 and the cross-sectional shape of the groove 14, the orientation of the bright material 10 is determined, so that the state of the orientation is not good and appearance defects are likely to be generated. Further, the flow mark 32 is likely to be generated in the region 24. This property becomes remarkable as the length of the long side 18 of the groove 14 is increased. Furthermore, if appearance defects are generated at a portion near the groove 14, it is not possible to secure high design properties. Accordingly, design properties are obtained only by painting after all.

However, as described above, in Condition 1, the condition of the groove depth Xd is made while the aspect ratio Y of the bright material 10 is high, that is, in the range of 30 to 50. Accordingly, the high metallic feeling caused by the bright material 10 is shown, so that it is possible to prevent appearance defects that are caused by the orientation near the groove 14. Therefore, the painting may not need to be performed on parts such as various garnishes of automotive parts that require high design properties.

<Metallic tone Resin: Condition 2>

Conditions 2 and 3 are conditions obtained by specifying Condition 1 with respect to a relationship between the aspect ratio Y and the groove depth Xd.

When an aspect ratio is denoted by Y and the depth of a rectangular groove on the design surface 12 is denoted by Xd [mm], the aspect ratio Y and the groove depth Xd [mm] are in the ranges satisfying the following Expression 1 or 2 in Condition 2 of this embodiment.)

$$Y \geq 30, Xd \geq 0.3, Y \leq -100Xd+80 \quad \text{(Expression 1)}$$

Referring to FIG. 1 again, a range, which corresponds to an aspect ratio Y of the bright material 10 and a groove depth Xd of the design surface 12 of Condition 2, is a triangular range that is formed by connecting points ACD of FIG. 1. In Condition 2, a range is formed by partitioning the range of Condition 1 by a linear expression of Xd, for example, is formed by eliminating a triangular range that has points ABC as apexes and corresponds to the combination of an aspect ratio Y of 50 and a groove depth of 0.5 [mm]. In Condition 2, even though a molding is complex so as to include a rectangular groove 14 and grooves (referred to as other grooves 15, see FIG. 10A) for another design shorter than a long side 18 of the groove 14, it is possible to secure high metallic feeling and to prevent appearance defects that are caused by the flowability of a resin.

Y is 30 if Xd is 0.5, and Y is 50 if Xd is 0.3. Accordingly, Expression (1) is obtained by setting up simultaneous equations of Y=aXd+b and solving the simultaneous equations with respect to a and b. If a plurality of grooves 14 and other grooves 15 is formed on the design surface 12, the upper limit of the aspect ratio Y may be 40 in consideration of reliable prevention of appearance defects. Meanwhile, the lower limit of the groove depth, which is 0.3 [mm], is a value determined by visibility. Accordingly, if Xd is 0.3 [mm], the upper limit of the aspect ratio Y becomes 40. Instead of Expression 1, the following Expression 2 is obtained by solving these simultaneous equations.

$$Y \geq 30, Xd \geq 0.3, Y \leq -50Xd+55 \quad \text{(Expression 2)}$$

Likewise, if the upper limit of the aspect ratio Y is adjusted, Expressions corresponding to Expressions 1 and 2 may be obtained by solving the simultaneous equations while corresponding to the lower limit of the groove depth.

Each of Expressions 1 and 2 and the obtained Expressions is referred to as an aspect ratio function. The aspect ratio function is a linear expression.

Operational Advantage of Condition 2

Condition 2 where the groove depth Xd is set to a length according to the aspect ratio Y by Expression 1 or 2 is a condition (aspect ratio function) where one of the aspect ratio Y and the depth Xd of the groove 14 is decreased when the other thereof is increased. Accordingly, even though the resin molding 11 includes a complex design surface 12 where a plurality of grooves 14 cross each other or a complex design surface 12 that includes other grooves 15 such as letters or marks in addition to the rectangular groove 14 formed on the design surface 12, it is possible to secure high metallic feeling and to prevent the generation of appearance defects. Therefore, painting may not need to be performed on a garnish having the complex design surface 12.

<Metallic Tone Resin: Condition 3>

In Condition 3 of this embodiment, a mean particle diameter of the bright material 10 is in the range of 5 to 20 [μm].

That is, a mean particle diameter of the bright material 10 is optimized in Condition 3. The reason why the lower limit is set to 5 [μm] is that appearance defects are likely to be generated if a bright material 10 having a particle diameter smaller than the mean particle diameter is used. That is, for example, if the same parts by weight of a bright material 10 having a particle diameter of 1 [μm] as a bright material having a particle diameter of 5 [μm] are added, the number of particles is increased although the degree of a metallic tone is equal to the degree of a metallic tone in the case of a particle diameter of 5 [μm]. Therefore, appearance defects become more noticeable.

The reason why the upper limit of the mean particle diameter is set to 20 [μm] is that an aspect ratio of about 30 can be obtained by this mean particle diameter. That is, if a mean particle diameter is set to 27 [μm], an aspect ratio may be lowered, so that metallic feeling deteriorates. That is, even though only a mean particle diameter is increased regardless of an aspect ratio, metallic feeling is not improved.

Operational Advantage of Condition 3

In Condition 3, a mean particle diameter is set in the range of 5 to 20 [μm]. Accordingly, it is possible to reduce cost by making a mean particle diameter be relatively small, and to obtain metallic feeling caused by an aspect ratio.

According to this embodiment as described above, when a part having a groove 14 on the design surface 12 thereof is molded by using a resin material where a bright material 10 having an aspect ratio Y in the range of about 30 to 50 is added, it is possible to secure the visibility of the part and to prevent the generation of the weld line 30 and the flow mark 32 by performing molding while the groove depth and the aspect ratio Y of the bright material 10 are in a diagonal range shown in FIG. 1.

A resin material, which contains a bright material 10 (of which an aspect ratio Y is in the range of 30 to 50) having high bright feeling and has been difficult to produce in large quantities due to problems of appearance defects in the related art, can be used in this embodiment by devising a resin material. Accordingly, even though the painting is not performed, it is possible to obtain high metallic feeling like the painting. For this reason, painting does not need to be performed, so that it is possible to eliminate the generation and discharge of volatile organic compound (VOC) that are to be generated due to painting. Further, since a painting process does not need to be performed, it is possible to reduce the number of processes and to reduce cost.

Embodiment 1

Embodiment 1 will be described below. In Embodiment 1, the above-mentioned Conditions 1 to 3 will be described in detail and Condition 4 is applied. First, the amount of the added bright material 10 (parts by weight) is examined. Then, a gate angle of Condition 4 will be described. Condition 4 corresponds to characteristics of Embodiment 2 (a manufacturing method) and Embodiment 3 (a metal mold).

<The Amount of Added Bright Material (Parts by Weight)>

A test piece 28 shown in FIG. 6 was produced, a prototype of a resin molding that contained a bright material 10 having a relatively large aspect ratio Y was made, and a relationship between the amount of the added bright material 10 and strength of the test piece 28 was checked. Further, a hole 29 was formed at the test piece 28 so that the degree of generation of a weld line 30 could be evaluated. Furthermore, the flow mark 32 was likely to be generated near the gate 26. The AES resin was selected as a thermoplastic base resin, and a colorant was added.

The amount of the added bright material 10 needs to be determined in consideration of impact resistance of a material, a color forming property, and material cost. As the amount of the added bright material 10 is increased, metallic feeling is improved, so that it is possible to secure a metallic tone having high quality feeling. However, impact resistance deteriorates and material cost is also increased. For this reason, it is expected that metallic feeling is obtained by using a smaller amount of the added bright material.

In order to specify an effective amount of the added bright material based on 100 parts by weight of other materials and the AES resin, 0.5, 1.0, 2.0, and 4.0 parts by weight of the bright material 10 (of which a mean particle diameter is 5 μm and an aspect ratio Y is about 30) are added, and Charpy impact strength, metallic feeling, and the degree of generation of an appearance defect, such as a weld line 30 or a flow mark 32, were evaluated. Charpy impact strength was denoted by energy causing fracture, and was evaluated in accordance with ISO 179 (Type A notch ISO 179/1 eA, 23° C.). The results thereof are shown in Table 1.

TABLE 1

| The amount of the added bright material [parts by weight] | 0 | 0.5 | 1.0 | 2.0 | 4.0 |
|---|---|---|---|---|---|
| Charpy impact strength [kJ/m²] | 13 | 11 | 10 | 10 | 11 |
| Metallic feeling | — | x | Δ | ○ | ○ |
| Weld line | — | x | x | x | x |
| Flow mark | — | x | x | x | x |

Charpy impact strength (23° C.) was reduced due to the addition of the bright material. However, significant difference did not appear in a value of Charpy impact strength within the range of 0.5 to 4 parts by weight of the added bright material, and this range was a range where there was no problem in using the resin molding as a shift garnish. If the amount of the added bright material is 1.0 part by weight, metallic feeling could not be sufficiently secured. To secure sufficient metallic feeling, 2.0 parts by weight or more of the added bright material needed to be added. Meanwhile, since the base material of an AES resin was opaque, at least 2.0 parts by weight thereof needed to be added. However, even though 0.1 to 0.5 parts by weight of the bright material 10 was added to a resin, such as a PMMA resin or a PC resin, of which the base material was transparent, metallic feeling could be secured. In the range of 0.5 to 4.0 parts by weight of the added bright material, difference did not appear in the degree of generation of the weld line 30 and the flow mark 32. From the above-mentioned results, 2 parts by weight was decided as the amount of the added bright material.

Details of a molding material, where the amount of the added bright material was set to 2 parts by weight and other factors were changed, are shown in Table 2. An AES resin was selected as a base resin, and four kinds of bright materials of which mean particle diameters and aspect ratios Y were different from each other were added. As shown in Table 2, metallic feeling is improved as an aspect ratio Y is increased, but an appearance defect, such as a weld line 30 or a flow mark 32, is likely to be generated.

TABLE 2

| | Molding material 1 | Molding material 2 | Molding material 3 | Molding material 4 |
|---|---|---|---|---|
| Base resin | AES resin | AES resin | AES resin | AES resin |
| Mean Particle Diameter [μm] | 40 | 5 | 10 | 20 |
| Aspect ratio | about 10 | about 30 | about 40 | about 50 |
| Added amount [parts by weight] | 2 | 2 | 2 | 2 |
| Metallic Feeling | Do not exist | Exist | Significantly exist | Significantly exist |
| Appearance Defect | Be slightly likely to be generated | Be likely to be generated | Be very likely to be generated | Be very likely to be generated |

<Condition 4: Gate Angle>

A relationship among the groove 14 of the resin molding, a gate position (angle), and the flowability of a resin at the time of injection molding will be described below.

Figure 7:
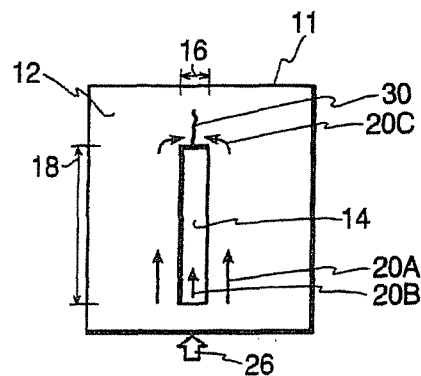
FIG. 7 is a view illustrating an example in which resin flows in a direction parallel to a long side of the groove according to Embodiment 1.

FIG. 7 is a view showing an example where a gate is disposed in a direction of a long side of the groove of the design surface 12. The groove 14 includes short sides 16 and long sides 18. If a gate 26 is disposed at an angle where a resin is supplied in a direction of the long side 18, the flow of the resin becomes fast resin flow 20A on the outside of the groove 14 and becomes slow resin flow 20B on the inside of the groove 14. As a result, the collision of a resin, which flows at an end of the long side 18 opposite to the gate 26, occurs, and the collision position thereof is likely to be in a specific region. Further, since the collision occurs at a relatively high velocity, a weld line 30 is likely to be generated.

Figure 8:
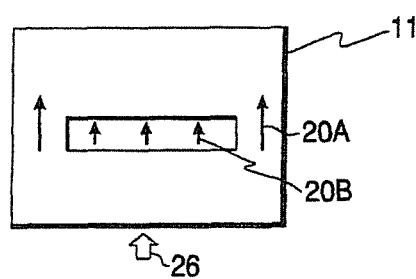
FIG. 8 is a view illustrating an example in which the resin flows in a direction parallel to a short side of the groove according to Embodiment 1.

FIG. 8 is a view showing an example where a gate is disposed in a direction of a short side of the groove of the design surface 12. In this example, if a gate 26 is disposed at an angle where a resin is supplied in a direction of the short side 16, likewise, the flow of the resin becomes fast resin flow 20A on the outside of the groove 14 and becomes slow resin flow 20B on the inside of the groove 14. However, since the collision position of the resin is not in a specific region and the collision velocity thereof is also relatively low, a weld line 30 is hardly generated as compared to the example shown in FIG. 7. In particular, considering that a time where the velocity of the resin flow in the groove 14 is reduced is short, velocity difference is small, and the velocity of the fast resin flow 20A generated near the short side 16 on the outside of the groove 14 becomes substantially equal to the velocity of the slow resin flow 20B generated in the groove 14 until collision, the intensity of the collision of the resin is decreased. In the case of an angle shown in FIG. 8, an appearance defect such as the flow mark 32 of the region, which is denoted by reference region 24 shown in FIG. 5, is likely to be generated depending on the groove depth Xd.

Next, the optimization of the gate position (gate angle) is attempted in order to adjust angles that are formed between the resin flows 20 and the long and short sides 18 and 16 of the groove. A weld line 30 is caused by the collision velocity of a resin and the size of a collision region. It is preferable that the resin flow be examined as a velocity vector from these and the velocity of the resin flow be uniformized regardless of the presence of the groove 14. Further, a property where the resin flow becomes slow in the groove 14 may be added.

Figure 9:
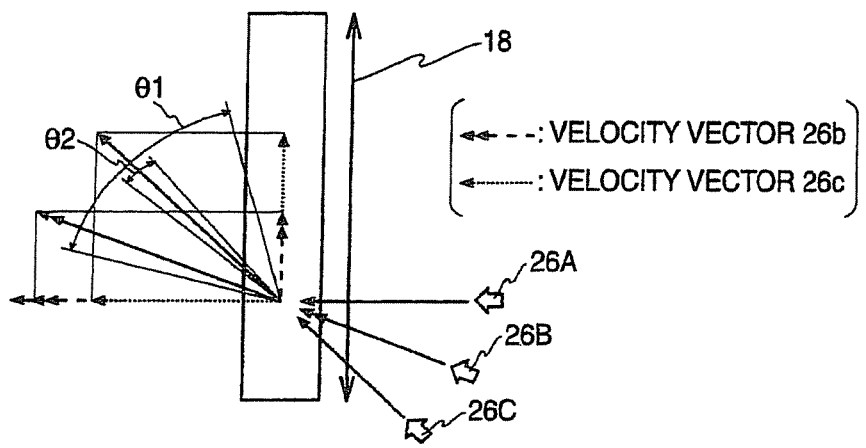
FIG. 9 is a view illustrating an example of a relationship between the groove on the design surface and a gate angle according to Embodiment 1.

FIG. 9 shows a relationship (gate angle) between the groove 14 and the gate position. A resin was supplied from first to third gates 26A, 26B, 26C that are represented by outline arrows of FIG. 9, and gate positions were represented by 90, 70, and 45° that are angles with respect to the direction of the long side 18 of the groove 14. The velocity vector of the resin flow at each of the gate angles is shown in FIG. 9. A first gate 26A corresponds to the same disposition as the gate shown in FIG. 8. A third gate 26C forms an angle of 45° with respect to the direction of the long side 18. A second gate 26B is slightly close to the angle of the third gate 26C in an angle range that is defined by the first and third gates 26A and 26C. In this example, it is thought that the generation of a weld line 30 is suppressed as much as possible since a velocity vector is shortened at 45° of the third gate position 26C.

Figure 10B:
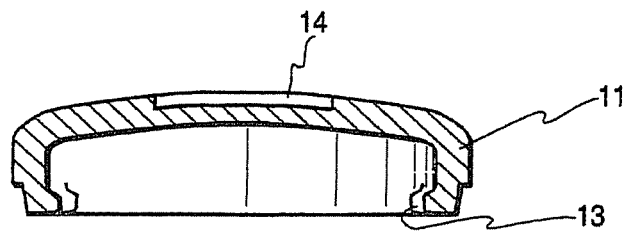
FIG. 10B is a cross-sectional view taken along the line A-A in FIG. 10A.

FIGS. 10A and 10B illustrate an example of an MT shift garnish. As shown in FIG. 10A, the MT shift garnish includes rectangular grooves 14 that are formed in vertical and horizontal directions in the drawing and represent the operative position and direction of a shift lever, and other grooves 15 that represent letters. The other grooves 15 include numerals 1 to 5 that denote gear positions, and a letter "R" that denotes a reverse position. FIG. 10B is a cross-sectional view taken along a line A-A of FIG. 10A. A hook portion 13 of the resin molding 11 is formed by undercutting, but is drawn at a slide core and fixes the garnish by the hook portion 13.

Figure 11:
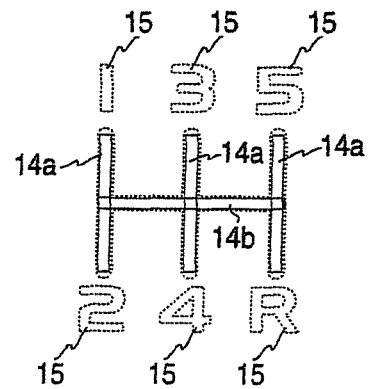
FIG. 11 is a view illustrating grooves on the design surface of the MT shift garnish according to Embodiment 1.

As shown in FIG. 11, the shift garnish includes vertical grooves 14a that each have a rectangular shape elongated in the vertical direction in the drawing, a horizontal groove 14b that is formed in the horizontal direction, and other grooves 15 that represent letters. The vertical groove 14a has curvature at the end thereof, but can be interpreted as the groove 14 since the vertical groove 14a has a rectangular shape formed by the long side 18 and the short side 16. The ends of the horizontal groove 14b are connected to the other grooves, but the horizontal groove is likewise the groove 14 that has a rectangular shape.

Figure 12:
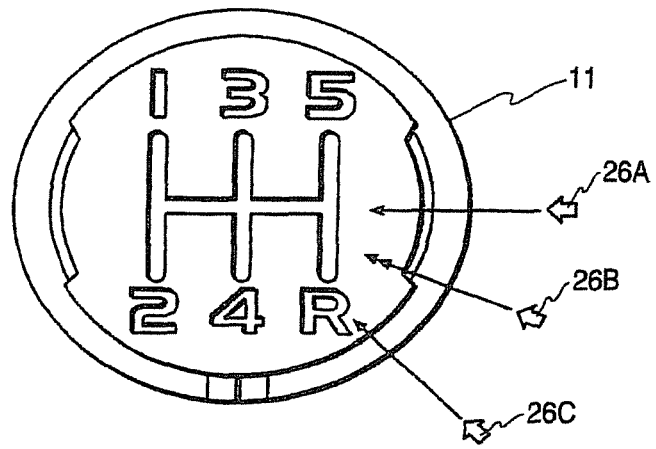
FIG. 12 is a view illustrating an example of a relationship between a metal mold of the MT shift garnish and a gate angle according to Embodiments 1 to 3.

In the example shown in FIG. 12, a metal mold was manufactured so that injection could be performed at three kinds of gate angles shown in FIG. 9 while the vertical grooves 14a formed at the center position of the shift garnish in a vertical direction in the drawing were used as axes. As shown in FIG. 12, the first gate 26A is provided on an extension line of a horizontal straight line 14b, and the second and third gates 26B and 26C are provided at positions that correspond to angles of 22.5° and 45° from the first gate 26A with respect to the central portion of the part, respectively.

When four kinds of materials shown in Table 2 were injected from each of the gates 26, the presence of a weld line 30 and a flow mark 32 was evaluated. The groove depth Xd is set to three values, that is, 0.3 [mm] that is regarded to correspond to the lower limit of the visibility, and 0.4 and 0.5 [mm] that correspond to more excellent visibility. The results thereof are shown in Tables 3 and 4. Table 3 shows the presence of the weld line 30 and Table 4 shows the presence of the flow mark 32.

TABLE 3

| Groove depth [mm] | Gate | Molding material 1 | Molding material 2 | Molding material 3 | Molding material 4 |
|---|---|---|---|---|---|
| 0.3 | 26A | x | x | ob | ob |
|  | 26B | x | x | x | x |
|  | 26C | x | x | x | x |
| 0.4 | 26A | x | x | ob; ol | ob |
|  | 26B | x | x | x | Δb; ol |
|  | 26C | x | x | x | ol |
| 0.5 | 26A | x | Δb; Δl | ob; ol | ob; ol |
|  | 26B | x | x | Δb; Δl | Δb; ol |
|  | 26C | x | x | ol | ol |

LEGENDS:
: Not generated;
Δb: Slightly generated from straight line b;
Δl: Slightly generated from letter;
ob: Generated from straight line b;
ol: Generated from letter.

TABLE 4

| Groove depth [mm] | Gate | Molding material 1 | Molding material 2 | Molding material 3 | Molding material 4 |
|---|---|---|---|---|---|
| 0.3 | 26A | x | x | x | x |
|  | 26B | x | x | x | x |
|  | 26C | x | x | x | x |
| 0.4 | 26A | x | x | x | oa |
|  | 26B | x | x | x | oa |
|  | 26C | x | x | x | Δa |
| 0.5 | 26A | x | Δa | oa | oa |
|  | 26B | x | x | Δa | oa |
|  | 26C | x | x | Δa | Δa |

LEGENDS:
: Not generated;
Δa: Slightly generated from straight line a;
oa: Generated from straight line a.

When molding was performed using a molding material [1] (of which a mean particle diameter was 40 μm and an aspect ratio Y was about 10), a weld line 30 and a flow mark 32 were not generated from a groove-shaped portion regardless of a groove depth and a gate position. However, appearance did not have a metallic feeling, and had very emphasized plastic feeling.

When molding was performed using a molding material [2] (of which a mean particle diameter was 5 μm and an aspect ratio Y was about 30), a weld line 30 and a flow mark 32 were not generated in the cases of groove depths of 0.3 and 0.4 [mm] even though the molding material was injected from any gate 26. However, when the molding material was injected from the first gate 26A, a weld line 30 and a flow mark 32 were generated in the case of a groove depth of 0.5 [mm]. In appearance, the same metallic feeling as a painted-component was obtained.

When molding was performed using a molding material [3] (of which a mean particle diameter was 10 μm and an aspect ratio Y was about 40), a weld line 30 was generated in the cases of groove depths of 0.3 and 0.4 [mm] only if the molding material was injected from the first gate 26A. Even though the molding material was injected from any gate 26, a weld line 30 and a flow mark 32 were generated in the case of a groove depth of 0.5 [mm]. In appearance, brightness is higher than the brightness corresponding to the molding material [2], high metallic feeling, as well as a painted-component was obtained.

When molding was performed using a molding material [4] (of which a mean particle diameter was 20 μm and an aspect ratio Y was about 50), a weld line 30 was generated in the case of a groove depth of 0.3 [mm] only if the molding material was injected from the first gate 26A. Even though the molding material was injected from any gate 26, a weld line 30 and a flow mark 32 were generated in the cases of groove depths of 0.4 and 0.5 [mm]. In appearance, brightness is higher than the brightness corresponding to the molding material [2], and the high metallic feeling, as well as the painted component was obtained.

Meanwhile, the followings were found out from these evaluation results. When a resin flowed in a direction parallel to the direction of the long side of the groove, a weld line 30 was likely to be generated. Further, as the length was large in the direction of the long side, a weld line tended to be easily generated. When a resin flowed in a direction orthogonal to the direction of the long side of the groove-shaped portion, a flow mark 32 was likely to be generated. Furthermore, as the length was large in the direction of the long side, a flow mark tended to be easily generated. It is preferable that a gate be provided at a position so that a resin does not flow in a direction parallel or orthogonal to the direction of the long side of the groove-shaped portion during the molding as much as possible.

Difference Between First and Second Gates 26A and 26B

When the groove depth Xd is 0.5 [mm] in the case of the molding material [2] of Tables 3 and 4, the results of the generation of the defects of the first gate 26A and the second gate 26B are different from each other. Further, when the groove depth Xd is 0.4 and 0.5 [mm] in the case of the molding material [3], the results of the generation of the weld line 30 are different from each other.

For this reason, if the gate angle is in the angle range of 45°±30° when the direction of the long side of the groove is regarded to correspond to 0°, it is possible to prevent the generation of defects and the aspect ratio Y. This angle range is shown by θ1 of FIG. 9. Meanwhile, the angle of the gate 26C corresponds to "the direction of 45° when the direction of the long side of the groove is regarded to correspond to 0°", and an angle obtained by adding 90° to 45° is the same angle. θ1 is the range of an angle, which is larger than an angle corresponding to this direction by 30°, to an angle, which is smaller than an angle corresponding to this direction by 30°.

Difference Between Second and Third Gates 26B and 26C

When the groove depth Xd is 0.5 [mm] in the case of the molding material [3] in Table 3, the results of the generation of a weld line 30 of the groove 14b are different from each other. Further, when the groove depth Xd is 0.4 and 0.5 [mm] in the case of the molding material [4], the results of the generation of a weld line 30 of the groove 14b are different from each other.

When the groove depth Xd is 0.4 and 0.5 [mm] in the case of the molding material [4] in Table 4, the results of the generation of a flow mark 32 are different from each other.

For this reason, if the gate angle is in the angle range of 45°±10° when the direction of the long side of the groove is regarded to correspond to 0°, it is possible to prevent the generation of defects and the aspect ratio Y. This angle range is shown by θ2 of FIG. 9.

Operational Advantage of Condition 4

From the above description, if the angle θ1 or θ2 of a resin flow of Condition 4 is applied, it is possible to obtain very high metallic feeling by using a bright material having a large aspect ratio Y, and to effectively prevent the generation of appearance defects, such as a weld line 30 and a flow mark 32. Further, if an aspect ratio Y of the bright material and a groove depth Xd with respect to the thickness Xt of the resin molding are made in the ranges of Condition 2, it is possible to secure the visibility of a part, to prevent the generation of a weld line 30 and a flow mark 32, and to obtain a part that has the same high design properties as a painted-component.

Condition 4 and the combination of Conditions 4 and 2 may be applied when the appearance of a part needs to be improved without painting a resin part. In particular, Condition 4 and the combination of Conditions 4 and 2 may be applied not to perform painting a resin part made of a molding material to which a bright material, such as aluminum powder or mica powder, is added.

Embodiment 2

Embodiment 2 of this embodiment will be described below.

<Manufacturing Method: Condition 4>

Figure 13:
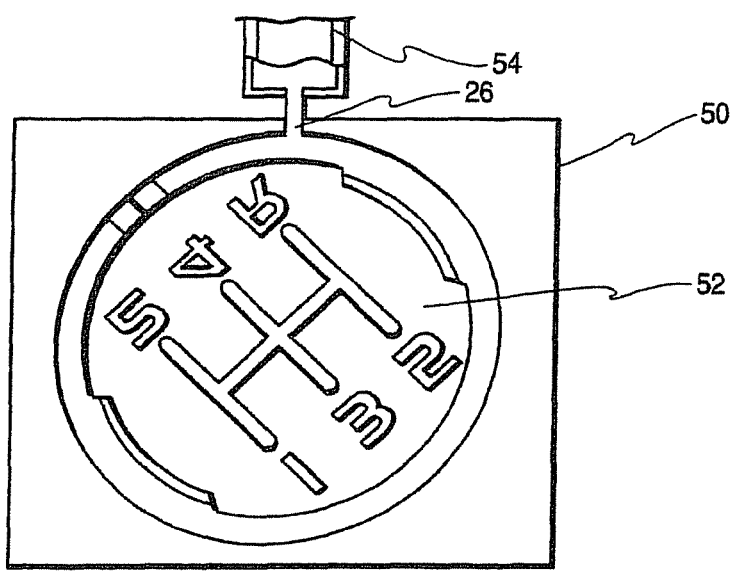
FIG. 13 is a view illustrating an example of a plate according to Embodiments 2 and 3.

FIG. 13 is a partial view cross-sectional view showing an example of a plate 50 that is used in Embodiments 2 and 3. The plate 50 is superimposed on another plate (not shown), so that a cavity 52 having the shape corresponding to the design surface 12 shown in FIG. 10A is formed. A resin is supplied into the cavity 52 so as to fill the cavity and is hardened by cooling or the like, so that a product (a resin molding, for example, an MT shift garnish) is formed.

Further, a gate, which connects a plate 50 to a runner 54 of an injection molding machine, is disposed at an angle (45°) shown in FIG. 13 in order to make a resin supply angle (gate angle), which is formed with respect to the direction of the long side 18 of the groove 14, be in the ranges of θ1 and θ2 of Condition 4.

Figure 14:
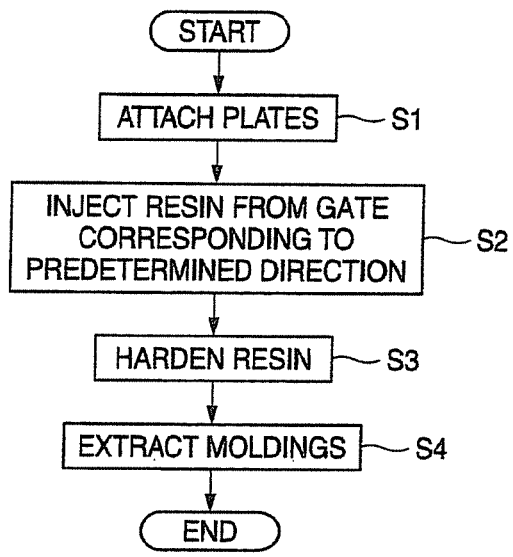
FIG. 14 is a flowchart illustrating an example of a manufacturing method according to Embodiment 2.

Referring to FIG. 14, in a manufacturing method of Embodiment 2, first, a cavity 52 corresponding to the shape of a molding 11 that has rectangular grooves 14 on a design surface 12, and a gate 26 through which a resin flows into the cavity are formed by superimposing a plurality of plates 50 (Step S1).

After that, a resin, which contains 0.1 to 4 parts by weight of a bright material such as aluminum powder based on 100 parts by weight of a thermoplastic resin, is injected to the cavity 52 through the gate 26 (Step S2). In this case, in Embodiment 2, a gate angle is made in the range of 45°±30° (θ1 shown in FIG. 9) when the direction of the long side of the groove is regarded to correspond to 0°, and a resin flows from the gate 26 corresponding to this angle. Further, when the aspect ratio Y or complexity of the design surface 12 is increased, the gate angle may be in the range of ±10° (θ2 shown in FIG. 9).

Subsequently, the resin is hardened by cooling or the like (Step S3), and the resin moldings are extracted by separating the plates 50 (Step S4).

If a resin containing the bright material 10 is supplied in the range of the gate angle θ1 or θ2, it is possible to make the degree of the appearance defects deteriorate even though appearance defects, such as a weld line 30 or a flow mark 32, are generated in the case of another angle (for example, an angle of the gate 26A shown in FIG. 9), or to prevent the generation of the appearance defects.

<Manufacturing Method: Conditions 4, 2 and 3>

As a method of manufacturing resin molding, a molding material, a groove depth Xd, and a gate angle may be optimized in order to obtain very high design properties. In this case, an aspect ratio Y and a groove depth Xd are in a predetermined range in accordance with the above-mentioned Condition 2.

That is, if the aspect ratio of the bright material is denoted by Y and the groove depth is denoted by Xd [mm], the aspect ratio Y and the groove depth Xd are in the range of Expression 1 or 2. That is, the aspect ratio and the groove depth are in the range of Condition 2. The depth of the groove is formed by the plates of the metal mold.

In this case, in Step S1 illustrated in FIG. 14, if the plates are superimposed, a cavity 52 having the groove depth Xd in the range of Condition 2 or 3 is formed. Further, in Step S2, a resin containing a bright material, which has an aspect ratio Y in the range of Condition 2 or 3, flows into the cavity.

Furthermore, a mean particle diameter of the bright material 10 may be in the range of Condition 3.

If the ranges of Conditions 2, 3, and 4 are satisfied, it is possible to prevent the generation of appearance defects as shown in Tables 3 and 4 even though the shape of the design surface 12 is complex as shown in FIG. 10A.

Embodiment 3

Embodiment 3 of this embodiment will be described below.

<Metal Mold: Condition 4>

Figure 15:
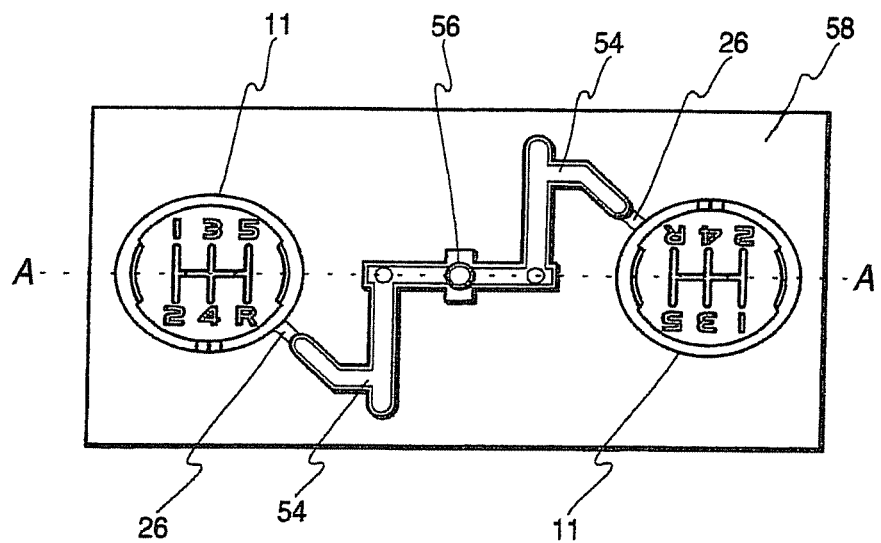
FIG. 15 is a view illustrating an example of a metal mold capable of forming two moldings at the same time, according to Embodiment 3.
Figure 16:
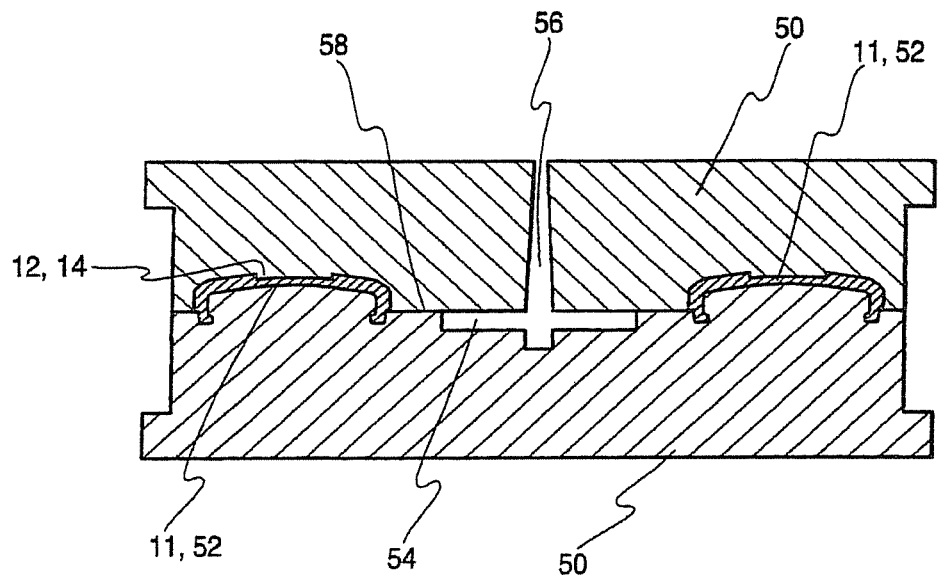
FIG. 16 is a cross-sectional view taken along the line A-A in FIG. 15.

FIG. 15 is a view showing an example of a metal mold, which forms two resin moldings, according to the invention, and is a plan view showing that resin moldings are placed on one plate 50. As shown in FIG. 15, a metal mold for a metallic tone resin molding of Embodiment 3 includes cavities 52 corresponding to the shape of a molding 11 that has rectangular grooves 14 on a design surface 12, gates 26 through which a resin containing a bright material 10 flows into the cavities 52, a sprue 56 that injects a resin to the gates through runners 54, and a plurality of plates 50 that forms the cavities 52.

Further, in Embodiment 3, according to Condition 4, the gate 26 is provided in the range of 45°±30° (θ1 shown in FIG. 9) when the direction of the long side of the groove 14 is regarded to correspond to 0°. Furthermore, when the aspect ratio Y or complexity of the design surface 12 is increased, the gate angle may be in the range of ±10° (θ2 shown in FIG. 9).

FIG. 16 is a cross-sectional view taken along a line A-A of FIG. 15. Two plates 50 are superimposed, and the plates are superimposed so that partings 58 are aligned, thereby forming the cavity 52. In the manufacturing method illustrated in FIG. 14, a resin containing a bright material 10 is injected to the cavity 52 and hardened, thereby forming a resin molding 11. Subsequently, the plate 50 is separated in a vertical direction of FIG. 16, and resin moldings are extracted.

Figure 17:
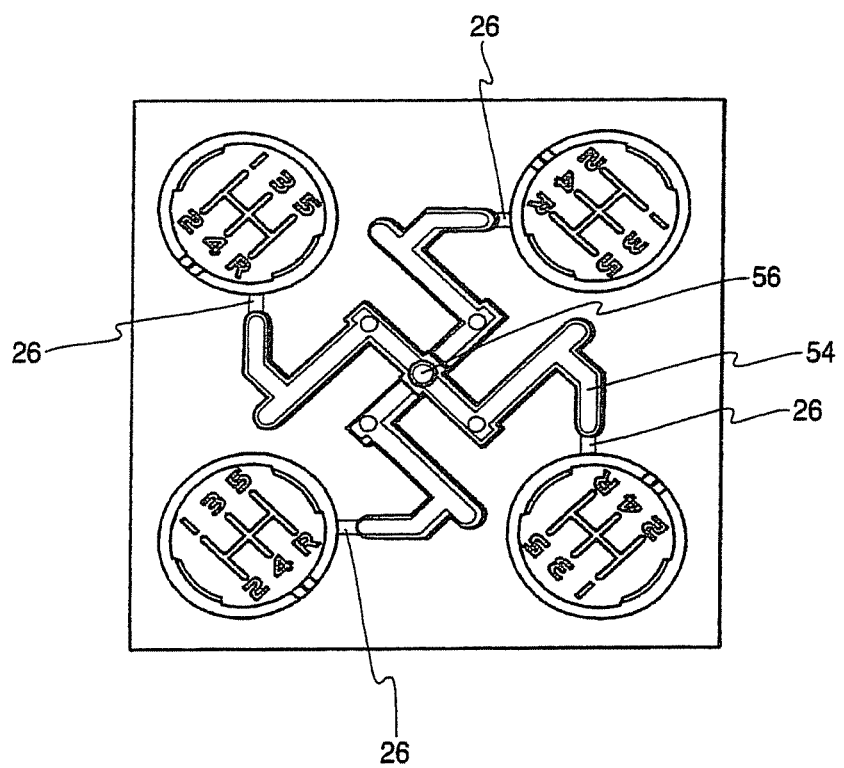
FIG. 17 is a view illustrating an example of the metal mold capable of forming four moldings at the same time, according to Embodiment 3.

FIG. 17 shows an economic metal mold of Embodiment 3, which forms four resin moldings and is obtained by the combination of the metal molds shown in FIG. 15. In this example, the area and volume of the metal mold is reduced as much as possible, and it is possible to form four moldings by one time molding. Accordingly, it is possible to further improve productivity.

Further, in the example shown in FIG. 17, a metal mold includes four cavities 52 that are disposed around the sprue 56 at the same distance from the sprue 56 at an interval of 45°. The metal mold includes runners 54 that supply a resin to the cavities 52 from the sprue 56 therethrough, have the same shape and length, and are disposed at an interval of 45°. The runners 54 are connected to gates 26 of the cavities 52. Furthermore, the directions of the gates 26 are determined so that the direction of the resin molding in the cavity 52 is in the range of a gate angle θ1 or θ2 of Condition 4.

In the example shown in FIG. 17, assuming that a numeral "3" of a resin molding corresponds to the upper side and a numeral "4" corresponds to the lower side, the design surface 12 is oriented in the cavity 52 so as to form an angle of 135° (45°+90°) with respect to a vertical direction. Accordingly, a metal mold for four moldings is formed, the cavities 52 have the same gate angle, and it is possible to reduce the area of the metal mold as much as possible.

In addition, since the runners 54 of the four cavities 52 are formed at an interval of 45° and have the same shape and length, it is possible to make the supply state or thermal change of a resin be the same as each other.

Meanwhile, the size of a metal mold and a molding machine should be increased in order to form eight or sixteen moldings. Further, if the size of the metal mold and the molding machine is increased, the length of the runner 54 is increased. For this reason, a resin is partially cooled in the runner 54. If the cooled resin is pushed by a resin to be supplied from the rear side and enters a product, a lump of the cooled resin appears on the design surface 12 and causes an appearance defect. Further, if flow length is increased, some kinds of resins cause short shot (are not filled), so that a yield is decreased.

According to the constitution shown in FIG. 17, the length of the runner 54 is short and these problems are not generated even in a metal mold for a plurality of moldings.

<Metal Mold: Conditions 4, 2, and 3>

A molding material and a groove depth Xd may be optimized in order to obtain very high design properties like in the Embodiment 2 by using a metal mold for a resin molding. In this case, an aspect ratio Y and a groove depth Xd are made in a predetermined range in accordance with the above-mentioned Condition 2 or 3.

That is, if the aspect ratio of the bright material 10 is denoted by Y and the groove depth is denoted by Xd [mm], the aspect ratio Y and the groove depth Xd are in the range of Expression 1 or 2. That is, the aspect ratio and the groove depth are in the range of Condition 2. The aspect ratio Y is achieved by a molding material.

In this case, the groove depth Xd shown in FIG. 10B is adjusted by the plates 50 of the metal mold of Embodiment 3, depending on the aspect ratio Y.

A mean particle diameter of the bright material 10 may be in the range of Condition 3.

Even though the shape of the design surface 12 is complex as shown in FIG. 10A, it is possible to prevent the generation of the appearance defects as shown in Tables 3 and 4 in the range of Conditions 2, 3, and 4.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method for manufacturing a resin molding, comprising:
    laminating a plurality of plates to form a cavity and a gate through which resin material is injected into the cavity;
    injecting the resin material which is comprised of 100 parts by weight of thermoplastic resin and 0.1 to 4 parts by weight of bright material, into the cavity through the gate;
    hardening the resin material to form the resin molding; and
    separating the plates to extract the resin molding from the cavity,
    wherein the plates are formed such that:
    the resin molding includes a main body having a round-shaped design surface formed with a plurality of rect-angular-shaped grooves, the longest groove of which extends in a first direction, the lower limit of the depth of the grooves is set to 0.3 mm and the upper limit of the depth of the grooves is set to 0.5 mm,
    the gate extends toward a center of the round-shaped design surface and at an angle range of 45°±30° with respect to the first direction, the bright material has the aspect ratio of 30 to 50, and
    Y and Xd satisfy the following expressions:

$Y \geq 30;$ $Xd \geq 0.3;$ and $Y \leq -100Xd + 80,$ where Y denotes the aspect ratio of the bright material and Xd denotes the depth of the groove.

2. The method as set forth in claim 1, wherein the plates are formed such that the gate extends at an angle range of 45°±10° with respect to the first direction.

3. The method as set forth in claim 2, wherein the plates are formed such that the gate extends at an angle of 45° with respect to the first direction.

4. The method as set forth in claim 1, wherein the plates are formed such that Y and Xd further satisfy the following expression:

$Y \leq -50Xd + 55.$

5. The method as set forth in claim 1, wherein the bright material has the mean particle diameter of 5 to 20 μm.

* * * * *